United States

Wunsch et al.

[11] 3,872,070

[45] Mar. 18, 1975

[54] DIBROMOBUTYL PHOSPHORONITRIDE ESTERS

[75] Inventors: Gerd Wunsch, Speyer; Volker Kiener, Ludwigshafen; Friedrich Fuchs, Kirchheim; Walter Himmele, Walldorf; Werner Fliege, Otterstadt, all of Germany

[73] Assignee: BASF Aktiengesellschaft, Ludwigshafen/Rhine, Germany

[22] Filed: Oct. 24, 1973

[21] Appl. No.: 409,256

[30] Foreign Application Priority Data
Oct. 26, 1972 Germany............................ 2252485

[52] U.S. Cl. .......... 260/927 N, 106/15 FP, 117/136
[51] Int. Cl. ...................... C07d 105/04, C09k 3/28
[58] Field of Search................................ 260/927 N Primary Examiner—Anton H. Sutto
Attorney, Agent, or Firm—Johnston, Keil, Thompson & Shurtleff

[57] ABSTRACT

Dibromobutyl phosphoronitride esters and a process for their manufacture.

2 Claims, No Drawings

DIBROMOBUTYL PHOSPHORONITRIDE ESTERS

This invention relates to novel compounds containing phosphorus, nitrogen and bromine, to a process for their manufacture, and to their use for the wash-resistant flameproofing of textiles of natural and synthetic fibers, particularly blends of such fibers and more particularly blends of polyester and cotton.

There have hitherto been only a few flameproofing agents for textiles and even fewer for polyester/cotton blends which are adequately durable to laundering and which do not have a marked detrimental effect on the properties of the textiles. It has already been proposed to flameproof such blends with flame retardants based on dispersions. combination of chloroparaffins with antimony trioxide and polyvinyl chloride dispersion. Such finishes have an adequate flameretardant action but they impart a very hard handle to the finished textile material and their resistance to washing is inadequate. Thus they cannot be used for articles of clothing but only for heavy fabrics such as tarpaulins, straps and the like.

N-methylol derivatives of 3-dimethylphosphono propionamide and tris-aziridinyl phosphine oxide and tetrahydroxymethyl phosphonium bromide have also been used as flameproofing agents for textiles. However, these compounds exhibit relatively good fastness to washing only on cotton and in some cases they have an undesirable effect on the handle.

It is thus an object of the invention to provide a washresistant flameproofing agent for textiles which changes the properties of the textiles as little as possible and is also suitable for polyester/cotton blends.

It has been found that this object may be achieved by using the compounds I and II

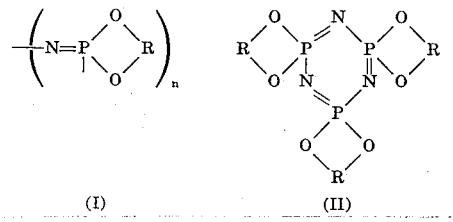

(I)    (II)

where R denotes the divalent radical

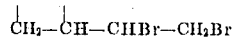

and $n$ is an integer of from 3 to 8 inclusive, and by a process for their manufacture involving the reaction of one or more oligomers of phosphoronitride dichloride of the formula $(-NPCl_2)_n$, where $n$ has the meaning given above, with at least equivalent amounts of a glycol of the formula III $$HO-CH_2-CHOH-CHBr-CH_2Br$$

(III)

or the glycol of formula IV $$HOCH_2-CHOH-CH=CH_2$$

(IV)

followed by bromination of the double bonds by known methods.

The oligomer mixture of phosphoronitride dichloride $(PNCl_2)_{3-8}$ is prepared by a conventional phosphoronitride dichloride synthesis (cf. G. Wunsch, R. Schiedermaier, V. Keiner, "Chemische Zeitung," 94, 832 (1970); German Published Application No. 1,198,697). Its reaction with one of the glycols of the formulae III and IV takes place at temperatures of from $-5°$ to $+150°C$, preferably from $0°$ to $80°C$, optionally at superatmospheric or subatmospheric pressure. The compound II may be prepared from the trimeric phosphoronitride dichloride and the glycol of formula III in a similar manner.

By "at least equivalent amounts of glycol" we mean that the number of hydroxy groups in the reaction mixture is at least the same as the number of chlorine atoms. An excess of glycol is not detrimental.

It is advantageous to carry out the reaction in an inert organic solvent such as an aromatic hydrocarbon, e.g. benzene and toluene, in a chlorinated hydrocarbon, e.g. chlorobenzene, chloroform, methylene chloride and tetrachloroethane, or in an ether, e.g. tetrahydrofuran or dioxane.

It is convenient to add an acid-binding agent such as pyridine, triethanolamine or other amines, and these agents may also serve as the sole solvent if desired.

The reaction mixture obtained from the reaction of phosphoronitride dichloride oligomers with the brominated or the unsaturated glycol may be worked in both cases by precipitation of the resulting oligomeric phosphoronitride ester with water or alcohol or by subjecting the reaction mixture to steam distillation to remove excess pyridine or amine and excess alcohol. The phosphoronitride ester may then be extracted with a solvent such as methylene chloride or tetrachloroethane. After concentration of these solutions the oligomer mixture is obtained as a colorless solid both in the case of phosphoronitride ester with the butenediol and the phosphoronitride ester with the dibromobutanediol. The individual species (i.e. the trimer, tetramer, etc.) are crystalline substances when pure.

Bromination of the unsaturated phosphoronitride ester obtained by reaction with butenediol is effected by a conventional brominating method, for example by reaction with bromine in glacial acetic acid with cooling.

The use of these mixtures as flameproofing agents for textile materials is extremely simple. The textile to be flameproofed is impregnated with a 20 to 40% and preferably 28 to 35% aqueous dispersion or solution of the flameproofing agent in a suitable solvent such as dimethyl formamide by known methods, for example by padding or spraying, the wet pickup and the concentration of the liquor being adjusted so that the amount of flameproofing agent applied is from 12 to 45%, preferably from 16 to 22%, by weight of the dry weight of the fabric being treated. Although it is not essential to add binders or other auxiliaries, such an addition is not excluded from the scope of the invention.

The good flameproofing effects achieved with the compositions of the invention on cellulosic material is not surprising, but their extremely high durability to laundering even in the absence of binders of any kind was by no means foreseeable. As regards resistance to washing the novel compositions are better than any other known binder-free flameproofing agent for textiles and are at least comparable with the best of the known flameproofing agent/binder combinations. It is also surprising that polyester fibers and polyester/cotton blends containing a high proportion of polyester, which are known to be very difficult to render flameproof, exhibit a very high degree of flame retardance which is fast to washing. Such blends, when flameproofed according to the invention, even withstand the severe test according to German Standard Specification DIN 53,906 ("vertical test"). It is unlikely that this is the case with any prior art flameproofing agent.

The textile finishing process of the invention may be combined with other finishing processes, for example resin finishing or processes for rendering the textiles hydrophobic or resistant to oils.

The invention is further illustrated by the following Examples in which parts and percentages are by weight.

EXAMPLE 1

To a solution of 116 parts of trimeric phosphoronitride dichloride in 240 parts of pyridine there are added 250 parts of 1,2-dibromobutane-3,4-diol in 300 parts of tetrahydrofuran. The reaction mixture is then stirred for 20 hours at room temperature and for 4 hours at 70°C. The reaction mixture is then cooled and, after filtering off the pyridine hydrochloride formed, poured into 2,000 parts of water. Two liquid phases form, of which the lower one is separated, and the solvent is removed in vacuo. The residue consists of 259 parts of phosphoronitride ester of formula II, this being equivalent to 81% of theory. The ester is recrystallized from methanol and then has a melting range of 111° to 114°C.

found: P 10.3%  N 4.8%  C 17.4%  Br 52.7%  O 11.2%
calc.: P 10.6%  N 4.8%  C 16.5%  Br 55.0%  O 11.0%

The molecular weight, determined in acetone, was found to be 820, the theoretical value being 873. The infrared spectrum gave $\gamma_{PNP}$ 1240 cm$^{-1}$.

EXAMPLE 2

To a solution of 116 parts of trimeric phosphoronitride dichloride and 240 parts of pyridine there are added dropwise, at 10°C, 264 parts of 1,2-dihydroxybutene-3. The reaction mixture is stirred for 10 hours at room temperature and then for 2 hours at 70°C.

The reaction mixture is cooled and poured into 1,000 parts of water. This causes precipitation of the phosphoronitride ester of the formula:

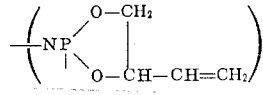

which is filtered off and dried. The crude yield is 119 parts, this being equivalent to 91% of theory.

The ester may be recrystallized from a benzene/heptane mixture and then has a melting point of 179°C. Infrared spectrum shows: $\gamma_{PNP}$ 1225 cm$^{-1}$.

For the bromination process, 100 parts of the phosphoronitride ester are dissolved in glacial acetic acid and bromine is added dropwise in a stoichiometric amount (183 parts) at a temperature of from 0° to 5°C. On completion of bromination, the solvent is removed.

The residue consists of 214 parts of the compound of the formula II (96% of theory), the melting point being 110–113°C after recrystallization from an ethanol/hexane mixture.

The infrared spectrum is identical with that found for the compound (II) of Example 1.

EXAMPLE 3

To a solution of 232 parts of an oligomer mixture of phosphoronitride dichloride having the following composition: 65% of $(NPCl_2)_3$, 21% of $(NPCl_2)_4$, 8% of $(NPCl_2)_5$, 4% of $(NPCl_2)_6$, 1.5% of $(NPCl_2)_7$ and 0.5% of $(NPCl_2)_n$, in 480 parts of pyridine there are added 520 parts of 1,2-dibromobutane-3,4-diol in 600 parts of tetrahydrofuran at a temperature of from 10° to 15°C.

The reaction mixture is then stirred for 12 hours at room temperature and then for 2 hours at 80°C.

The reaction mixture is then cooled, the pyridine hydrochloride filtered and the filtrate is concentrated. The residue is a pale yellow solid phosphoronitride ester which may be purified by reprecipitation with an acetone/water or tetrahydrofuran/water mixture.

The yield is 506 parts, this being equivalent to 87% of theory, and the product has a melting range of from 40° to 80°C.

Elementary analysis gave the following results: P 9.8%, O 11.5% and Br 52.3%, the theoretical values being the same in Example 1.

EXAMPLE 4

350 parts of the compound of formula II are dissolved in dimethyl formamide (DMF) to give a total solution of 1,000 parts.

Cotton twill weighing 176 g/m$^2$ is padded with this solution, the amount of compound II applied being 43.5% based on the dry weight of the fabric.

The padded fabric is dried at 100°C, conditioned for 24 hours (under normal climatic conditions) and then tested according to German Standard Specification DIN 53,906.

The fabric exhibits excellent flame retardance. At an ignition time of 6 seconds (DIN 53,906), the following results are obtained:

burning time:  0 sec.
glow time:  0 sec.
length of tear under 50g load: 85 mm.

Untreated fabric burns away completely.

When the treated fabric is washed for 10 hours at 95°C with a commercial detergent (2g of detergent per liter of washing liquor) with intermediate drying after 2 hours and again after 6 hours, the amount of flameproofing agent remaining on the material is only 19.4%. However, flame retardance is still very good, as measured by DIN 53,906:

burning time:  1 sec.
glow time:  0 sec.
length of tear (50g load):  95 mm.

EXAMPLE 5

300 parts of compound II are dissolved in DMF and the solution is made up to 1,000 parts with the same solvent.

This solution is used to impregnate a fabric consisting of a blend of 50 parts of polyester and 50 parts of cotton and weighing 112 g/m², the amount of compound II applied being 22.6% of the dry weight of the fabric.

After padding, the fabric is dried at 100°C and then conditioned for 24 hours under normal climatic conditions. The results obtained in the test according to German Standard Specification DIN 53,906 are as follows:

| | |
|---|---|
| ignition time: | 6 sec. |
| burning time: | 0 sec. |
| glow time: | 0 sec. |
| length of tear (50g load): | 140 mm. |

The flameproof finish is extremely fast to washing. The fabric is washed for 10 hours at 60°C with 2 g/l of a commercial detergent with intermediate drying after 2 to 6 hours. The amount of flameproofing agent remaining on the fabric after this washing process is 20.1%.

The following results were obtained in the test according to DIN 53,906:

| | |
|---|---|
| ignition time: | 6 sec. |
| burning time: | 0 sec. |
| glow time: | 0 sec. |
| length of tear (50g load): | 124 mm. |

EXAMPLE 6

350 parts of compound II are dissolved in DMF and made up to 1,000 parts with the same solvent.

This flameproofing solution is used to impregnate a fabric weighing 157 g/m² and consisting of 67 parts of polyester and 33 parts of cotton, the amount of compound II applied being 29.3% based on the dry weight of the fabric.

After padding, the fabric is dried at 100°C.

It is then conditioned for 24 hours under normal climatic conditions and tested according to DIN 53,906 with the following results:

| | |
|---|---|
| ignition time: | 6 sec. |
| burning time: | 0 sec. |
| glow time: | 0 sec. |
| length of tear (50g load): | 115 mm. |

It is washed for 10 hours at 60°C with 2 g/l of a commercial detergent, with intermediate drying after 2 and 6 hours.

After this washing process, the amount of flameproofing agent on the material is 22.5%. The following results were obtained in the test according to DIN 53,906:

| | |
|---|---|
| ignition time: | 6 sec. |
| burning time: | 0 sec. |
| glow time: | 0 sec. |
| length of tear (50g load): | 96 mm. |

EXAMPLE 7

350 parts of compound II are dissolved in DMF and made up to 1,000 parts with the same solvent. The solution is used to impregnate cotton twill weighing 176 g/m² by padding as described in Example 4. The fabric is then dried at 100°C and padded with an aqueous solution containing 90 parts of hexamethylol melamine pentamethyl ether and 10 parts of sulfuric acid per liter of solution, dried and condensed for 5 minutes at 160°C.

After conditioning for 24 hours under normal climatic conditions, the total amount applied is found to be 52.4%.

The fabric thus treated is self-extinguishing. The results of the test according to DIN 53,906 are as follows:

| | |
|---|---|
| ignition time: | 6 sec. |
| burning time: | 0 sec. |
| glow time: | 0 sec. |
| length of tear (50g load): | 100 mm. |

After washing as described in Example 4, the amount of flameproofing agent remaining on the fabric is found to be 26.4%. Renewed testing according to DIN 53,906 gave the following results:

| | |
|---|---|
| ignition time: | 6 sec. |
| burning time: | 1 sec. |
| glow time: | 0 sec. |
| length of tear (50g load): | 100 mm. |

EXAMPLE 8

400 parts of compound II are dissolved in DMF and made up to 1,000 parts with the same solvent. This solution is used for impregnating polyester fabric weighing 108 g/m² by padding, the amount of flameproofing agent applied being 23.6% based on the dry weight of the fabric.

The fabric is then dried.

The flammability of the synthetic textile material thus treated is distinctly reduced. Using the semicircle tester described by G. Schon, Melliand Textilbericht, 48, 215 (1967) the burning angle of the polyester fabric thus treated is found to be half that for untreated fabric.

EXAMPLE 9

350 parts of the phosphoronitride diester oligomer mixture obtained in Example 3

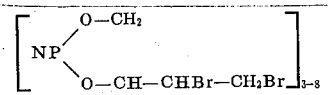

are dissolved in DMF and made up to 1,000 parts with the same solvent.

This solution is used to impregnate a fabric weighing 157 g/m² and consisting of 50 parts of polyester and 50 parts of cotton, the amount of flameproofing agent applied being 28.9% based on the dry weight of the textile.

The fabric is then dried at 100°C.

The flammability of the treated fabric is greatly reduced. Using the tester of Example 8, the following results are obtained:

| | |
|---|---|
| untreated fabric: | 180° |
| treated fabric: | 20°. |

We claim:
1. A compound of the formula
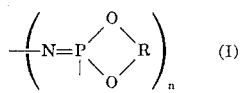 (I)
where R denotes the divalent radical
and $n$ is an integer of from 3 to 8 inclusive, and mixtures thereof.
2. The compound of the formula
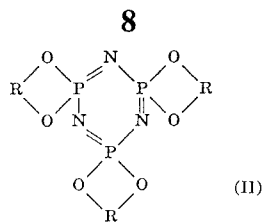 (II)
where R is the divalent radical
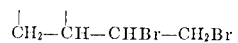
* * * * *